(12) United States Patent
Sitler et al.

(10) Patent No.: US 10,428,676 B2
(45) Date of Patent: Oct. 1, 2019

(54) TIP CLEARANCE CONTROL WITH VARIABLE SPEED BLOWER

(71) Applicants: Rolls-Royce Corporation, Indianapolis, IN (US); Rolls-Royce North American Technologies Inc., Indianapolis, IN (US)

(72) Inventors: Adrian Carl Sitler, Indianapolis, IN (US); Andrew Eifert, Indianapolis, IN (US); Ryan C. Humes, Indianapolis, IN (US)

(73) Assignees: ROLLS-ROYCE CORPORATION, Indianapolis, IN (US); ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 176 days.

(21) Appl. No.: 15/621,667

(22) Filed: Jun. 13, 2017

(65) Prior Publication Data

US 2018/0355747 A1 Dec. 13, 2018

(51) Int. Cl.
| | |
|---|---|
| *F01D 11/00* | (2006.01) |
| *F01D 11/24* | (2006.01) |
| *F01D 25/14* | (2006.01) |
| *F02C 7/18* | (2006.01) |
| *F02C 7/32* | (2006.01) |

(52) U.S. Cl.
CPC .............. *F01D 11/24* (2013.01); *F01D 25/14* (2013.01); *F02C 7/18* (2013.01); *F02C 7/32* (2013.01); *F05D 2240/40* (2013.01); *F05D 2260/201* (2013.01); *F05D 2270/3062* (2013.01); *F05D 2270/44* (2013.01)

(58) Field of Classification Search
CPC ................................. F01D 11/24; F01D 25/14
See application file for complete search history.

(56) References Cited

U.S. PATENT DOCUMENTS

| | | | | |
|---|---|---|---|---|
| 4,053,254 | A * | 10/1977 | Chaplin | F01D 11/08 415/116 |
| 4,242,042 | A * | 12/1980 | Schwarz | F01D 11/24 415/116 |
| 4,247,248 | A * | 1/1981 | Chaplin | F01D 11/24 415/136 |
| 4,928,240 | A | 5/1990 | Davison et al. | |
| 5,149,247 | A * | 9/1992 | Gros | F01D 25/12 415/108 |
| 5,160,241 | A * | 11/1992 | Glynn | F01D 9/06 415/116 |

(Continued)

*Primary Examiner* — Hieu T Vo
*Assistant Examiner* — Sherman D Manley
(74) *Attorney, Agent, or Firm* — Brinks Gilson & Lione

(57) ABSTRACT

Systems and methods for controlling tip clearance in a gas turbine engine are provided. The system may include a distribution manifold positioned along an outer surface of an engine case of a gas turbine engine. The distribution manifold may include a plurality of outlets defined on the distribution manifold to direct a thermal fluid received by the distribution manifold onto an outer surface of the engine case of the gas turbine engine. The system may further include a variable blower configured to blow the thermal fluid into the distribution manifold at a flow rate controlled by the variable blower. The flow rate through the variable blower may be adjustable over a range of non-zero target flow rates.

18 Claims, 9 Drawing Sheets

(56) References Cited

U.S. PATENT DOCUMENTS

| | | | | |
|---|---|---|---|---|
| 5,351,478 | A * | 10/1994 | Walker | F01D 25/26 415/144 |
| 5,399,066 | A * | 3/1995 | Ritchie | F01D 11/24 165/47 |
| 5,478,214 | A * | 12/1995 | Howarth | F04D 25/166 415/60 |
| 5,819,525 | A * | 10/1998 | Gaul | F01D 25/24 60/806 |
| 6,019,575 | A * | 2/2000 | Boursy | F01D 25/007 415/121.2 |
| 7,293,953 | B2 * | 11/2007 | Leach | F01D 11/10 415/116 |
| 7,837,429 | B2 * | 11/2010 | Zhang | F01D 11/24 415/1 |
| 8,434,997 | B2 | 5/2013 | Pinero et al. | |
| 8,801,370 | B2 * | 8/2014 | Erickson | F01D 11/24 415/173.1 |
| 9,528,391 | B2 * | 12/2016 | Dougan, Jr. | F01D 25/243 |
| 9,803,501 | B2 * | 10/2017 | Wang | F01D 25/162 |
| 2008/0014078 | A1 | 1/2008 | Suciu et al. | |
| 2008/0089780 | A1 | 4/2008 | Erickson et al. | |
| 2010/0189549 | A1 * | 7/2010 | Gilman | F01D 17/162 415/148 |
| 2013/0149120 | A1 | 6/2013 | Munshi et al. | |
| 2014/0230400 | A1 * | 8/2014 | Light | F01D 5/08 60/39.5 |
| 2017/0363108 | A1 * | 12/2017 | Dierksmeier | F01D 25/12 |

* cited by examiner

TIP CLEARANCE CONTROL WITH VARIABLE SPEED BLOWER

TECHNICAL FIELD

This disclosure relates to gas turbine engine and, in particular, to controlling tip clearance in gas turbine engines.

BACKGROUND

The heat produced by a gas turbine engine may vary a tip clearance of rotating hardware within the gas turbine engine. The tip clearance may be the distance between tips of turbine blades and an inner surface of a casing that houses the turbine blades. Tip clearance that is too small may result in undesirable contact between the tips of the turbine blades and a casing for the turbine blades. On the other hand, tip clearance that is too large may result in leakage past the tips of the turbine blades, and/or to operational inefficiencies, instability, and other undesirable results. Present approaches to managing tip clearance may suffer from a variety of drawbacks, limitations, and disadvantages. There is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system for managing tip clearance in a gas turbine engine is provided. The system may include a distribution manifold positioned along an outer surface of an engine case of a gas turbine engine. The distribution manifold may include a plurality of outlets defined on the distribution manifold to direct a thermal fluid received by the distribution manifold onto an outer surface of the engine case of the gas turbine engine. The system may further include a variable blower configured to blow the thermal fluid into the distribution manifold at a flow rate controlled by the variable blower. The flow rate through the variable blower may be adjustable over a range of non-zero target flow rates. The thermal fluid from the variable blower may be applied to the plurality of outlets. In some examples, the flow rate adjusted by the variable blower may not be adjusted by a physical valve.

One interesting feature of the systems and methods described below may be that the variable blower may vary the flow rate of the thermal fluid applied to the engine case without the thermal fluid passing through a valve either within the variable blower or downstream of the variable blower. Alternatively or in addition, an interesting feature of the systems and methods described below may be that the variable blower may be more reliable than a valve so that managing tip clearance is more reliable with a variable blower than with a combination of a fixed speed blower and a flow rate control valve. Alternatively or in addition, an interesting feature of the systems and method described below may be that the output of the variable blower may vary to modulate a gap between the respective tips of turbine blades and the engine case of the gas turbine engine without including a valve on a path of the thermal fluid between the output of the variable blower and the outer surface of the engine case.

Figure 1:
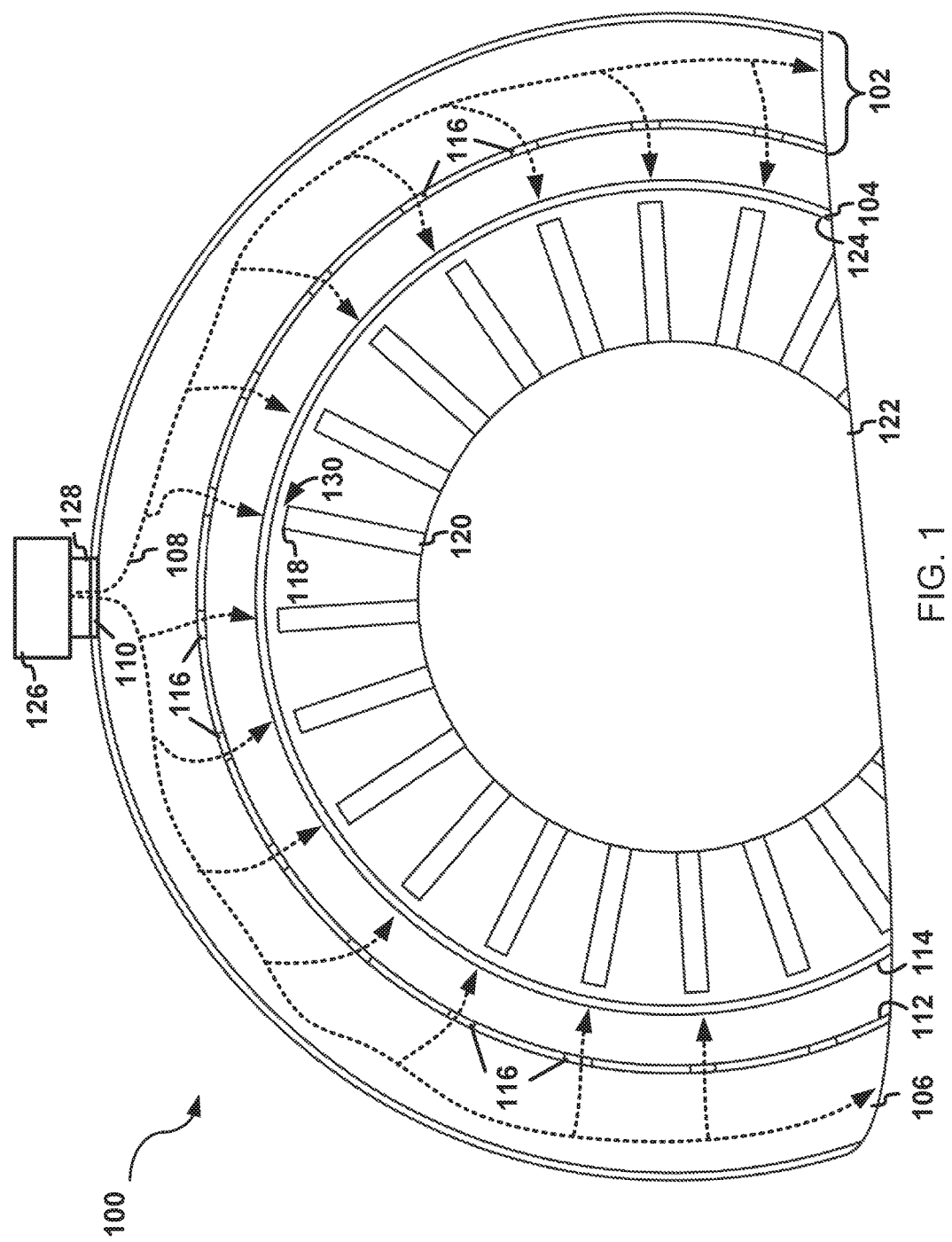
FIG. 1 illustrates an example of a system to control tip clearance in a gas turbine engine that includes a variable blower.

FIG. 1 illustrates an example of a system 100 to control tip clearance in a gas turbine engine. The system 100 may include a distribution manifold 102 positioned along an engine case 104 for a turbine of the gas turbine engine. The distribution manifold 102 may include a passageway 106 for a thermal fluid 108, an inlet 110 configured to direct the thermal fluid 108 into the passageway 106, and an inner surface 112. The inner surface 112 of the distribution manifold 102 may extend along and face an outer surface 114 of the engine case 104. The inner surface 112 of the distribution manifold 102 may include a plurality of outlets 116 configured to receive the thermal fluid 108 from the passageway 106. The outlets 116 may direct the thermal fluid 108 from the passageway 106 onto the outer surface 114 of the engine case 104. A tip 118 of a turbine blade 120 for a turbine 122 may be configured to rotate along an inner surface 124 of the engine case 104. The inner surface 124 of the engine case 104 faces radially inward and is opposite of the outer surface 114 of the engine case 104 onto which the thermal fluid 108 is directed.

The system 100 illustrated in FIG. 1 includes a variable blower 126 configured to provide the distribution manifold 102 with the thermal fluid 108. The variable blower 126 may include an outlet (shown in FIG. 2) in fluid communication with the inlet 110 of the distribution manifold 102 to define a flow path 128 between the variable blower 126 and the passageway 106.

The engine case 104 may receive heat produced from combustion, blade rotation, friction, and other aspects of operating the gas turbine engine. The heat generated by the gas turbine engine may deform the engine case 104. For example, the engine case 104 and/or portions of the engine case 104 may expand as heat is applied to the engine case 104. For example, a diameter of the engine case 104 may expand has the engine case 104 is heated. In addition, the diameter of the engine case 104 may contract as the engine case 104 is cooled. As the engine case 104 deforms, a gap 130 between the tip 118 of the turbine blade 120 and the inner surface 124 of the engine case 104 may increase, resulting in operational inefficiencies and other undesirable results.

The variable blower 126 may control the gap 130 by varying the flow of thermal fluid 108 applied to the engine case 104. For example, the variable blower 126 may vary the flow rate of the thermal fluid 108 applied to the engine case 104 to increase, decrease, maintain, and/or otherwise control the gap 130. In some examples, the flow rate of the thermal fluid 108 may be varied without adjusting a valve or a damper, such as, for example, a butterfly valve, in the variable blower 126, the distribution manifold 102, and/or any component connected between the variable blower 126 and distribution manifold 102. For example the flow path 128 may not include any kind of damper that controls the flow rate of the thermal fluid 108. Alternatively or in addition, the thermal fluid 108 may not pass through a valve, or any other kind of damper, configured to vary the flow rate of the thermal fluid 108.

The distribution manifold 102 may include a structure for distributing a gaseous or non-gaseous fluid. The distribution manifold 102 may direct the thermal fluid 108 received from a larger inlet to one or more smaller outlets. The distribution manifold 102 may distribute the thermal fluid 108 onto the engine case 104. For example, the distribution manifold 102 may receive the thermal fluid 108 from the inlet 110. The distribution manifold 102 may direct the thermal fluid 108 through the passageway 106 and out of the distribution manifold 102 through the outlets 116. In some examples, the distribution manifold 102 may distribute the thermal fluid 108 across the outer surface 114 of the engine case 104. For example, the distribution manifold 102 may extend around all or a portion of engine case 104. In addition, the distribution manifold 102 may follow the contours of the engine case 104. In some examples, the distribution manifold 102 may have a torus shape. In some examples, the distribution manifold 102 may be coupled to the engine case 104, the gas turbine engine, and/or any other structure neighboring or joined to the gas turbine engine.

The passageway 106 of the distribution manifold 102 may include a chamber defined by the distribution manifold 102. For example, the passageway 106 may include a cavity or a plurality of cavities defined inside of the distribution manifold 102. The passageway 106 may direct the thermal fluid 108 from the inlet 110 of the distribution manifold 102 to the outlets 116. The distribution manifold 102 may define the passageway 106 to distribute the thermal fluid 108 across the outlets 116. In some examples, the passageway 106 may include a plurality of passageways. Alternatively or in addition, the distribution manifold 102 may include additional structures inside of the passageway 106, such as, for example, walls, ducts, vanes, and/or any other structure that directs the thermal fluid 108 through the passageway 106.

The thermal fluid 108 may include any gaseous or non-gaseous fluid. Examples of the thermal fluid 108 may include air, cooling air, and cooled cooling air. The thermal fluid 108 may include air received outside of the distribution manifold 102. For example, the thermal fluid 108 may include bypass air in a turbo fan engine. Alternatively or in addition, the thermal fluid 108 may include air from that passed through a core of the gas turbine engine. In some examples, the thermal fluid 108 may be cooled before it is received by the distribution manifold 102 or the variable blower 126. In some examples, the thermal fluid 108 may be augmented for improved thermal control, flow, and other design considerations. For example, the thermal fluid 108 may include a mixture of fluids. Alternatively or in addition, the variable blower 126 may pressurize, or increase the pressure of, the thermal fluid 108 transferred into the passageway 106 of the distribution manifold 102. The pressure created by the variable blower 126 may cause the thermal fluid 108 to flow along the flow path 128 and onto the outer surface 114 of the engine case 104 via the outlets 116 of the distribution manifold 102.

The inlet 110 of the distribution manifold 102 may include any opening configured to receive the thermal fluid 108. The cross section of the inlet 110 (not shown in FIG. 1) may include a circle, a square, or any other geometric or non-geometric shape. In some examples, the inlet 110 may define all or a portion of the flow path 128.

The inner surface 112 of the distribution manifold 102 may include a portion of an exterior surface of the distribution manifold 102 that extends along the outer surface 114 of the engine case 104. The inner surface 112 of the distribution manifold 102 may include a radially-inward facing portion of the distribution manifold 102, relative to the gas turbine engine. The inner surface 112 of the distribution manifold 102, in some examples, may follow the contours of the outer surface 114 of the engine case 104. For example, the inner surface 112 of the distribution manifold 102 may curve around a portion or all of the engine case 104. In some examples, the inner surface 112 of the distribution manifold 102 may join the outer surface 114 of the engine case 104. Alternatively, as show in FIG. 1, the inner surface 112 of the distribution manifold 102 and the outer surface 114 of the engine case 104 may be separate and distinct.

The inner surface 112 of the distribution manifold 102 may include the outlets 116. The outlets 116 may include cooling holes defined on the inner surface 112 of the distribution manifold 102. The outlets 116 may extend from the inner surface 112 into the passageway 106. The thermal fluid 108 may flow from the passageway 106, through the outlets 116, and onto the outer surface 114 of the engine case 104. The outlets 116 may be include any combination of geometric and/or non-geometric shaped outlets. In addition, inner surface 112 of the distribution manifold 102 may include an arrangement of the outlets 116 in a regular or non-regular pattern.

During operation of the system 100, it may be desirable to control the flow rate of the thermal fluid 108 applied to the engine case 104 to control tip clearance. For example, the tip 118 of the turbine blade 120 may rotate along the inner surface 124 of the engine case 104. In some examples, the inner surface 124 of the engine case 104 may include a blade track. Varying an output of the variable blower 126 may cause a change in temperature of the engine case 104 thereby varying the gap 130 between the tip 118 of the turbine blade 120 and the inner surface 124 of the engine case 104. In some examples, the flow rate of the thermal fluid 108 supplied by the variable blower 126 may vary as the heat produced by the gas turbine engine varies during idle, take-off, climb, cruise, decent, landing, and other operational modes of the gas turbine engine. The gap 130 between the turbine blade 120 and the inner surface 124 of the engine case 104 may be maintained or otherwise controlled by varying the flowrate of the thermal fluid 108 provided to the distribution manifold 102 by the variable blower 126.

If the flow rate of the thermal fluid 108 were constant during operation of the gas turbine engine, then the temperature of the engine case 104 would increase if the heat generated by the gas turbine engine were to increase. The increase of the temperature of the engine case 104 would cause the engine case 104 to expand and increase the gap 130 between the tip 118 of the turbine blade 120 and the inner surface 124 of the engine case 104. However, by causing the variable blower 126 to increase the flow rate of the thermal fluid 108 as the heat generated by the gas turbine engine increases, the temperature increase of engine case 104 may be limited or eliminated. Correspondingly, the increased flow rate of the thermal fluid 108 may limit or eliminate an increase in the gap 130 between the tip 118 of the turbine blade 120 and the inner surface 124 of the engine case 104.

In some examples, the variable blower 126 may include one or more components that force the thermal fluid 108 through the variable blower 126. The one or more components may adjust to vary the flow rate of the thermal fluid 108 applied to the engine case 104.

Figure 2:
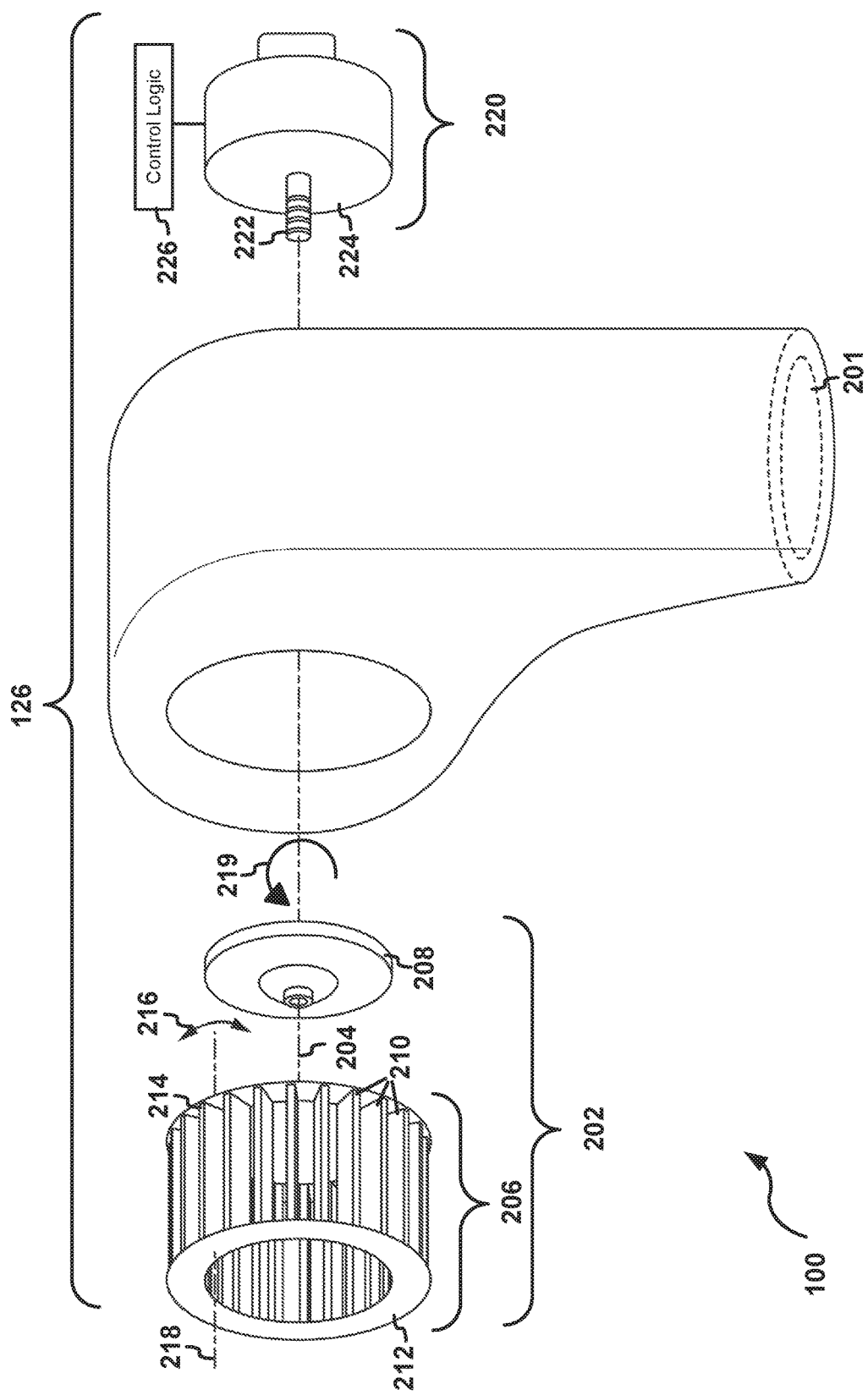
FIG. 2 illustrates an example of a variable blower.

FIG. 2 illustrates an example of the variable blower 126. The variable blower 126 may include any apparatus configured to blow the thermal fluid 108 and vary the flow rate of the thermal fluid 108 through the outlet 201 of the variable blower 126. The variable blower 126 may vary the flow rate of the thermal fluid 108 without a flow control valve. The flow rate through the variable blower 126 may be adjustable over a range of non-zero target flow rates. The range of non-zero target flow rates may include any two or more target flow rates that are not zero. For example, the variable blower 126 may vary a flow rate of the thermal fluid 108 after the variable blower 126 has begun blowing the thermal fluid 108. In some examples, the variable blower 126 may blow the thermal fluid 108 at a first positive flow rate. An adjustment to one or more components of the variable blower 126 may cause the thermal fluid 108 to flow at a second positive flow rate.

In some examples, the variable blower 126 may increase the flow rate of the thermal fluid 108 in response to an increase in an amount of power provided to the variable blower 126. Alternatively or in addition, the variable blower 126 may decrease the flow rate in response to a decrease in the amount of power provided to the variable blower 126. In other examples, the variable blower 126 may receive signals, such as, for example, analog or digital signals. The variable blower 126 may be responsive to the signals to vary the flow rate of the thermal fluid 108.

In some examples, the variable blower 126 may receive electric power and vary the flow rate of the thermal fluid 108 based on an amount of electric power received by the variable blower 126. Alternatively, the variable blower 126 may be mechanically powered. For example, the variable blower 126 may receive a drive belt (not shown in FIG. 2) that rotates one or more components of the variable blower 126. In other examples, the variable blower 126 may be driven by a gear drive. The variable blower 126 may vary the flow rate of the thermal fluid 108 based on the rotational speed of the drive belt and/or gear drive. Examples of the variable blower 126 may include a centrifugal blower, a positive displacement blower, a forward curved air lower, a backward-inclined blower, a backward-curved air blower, a radial air blower, an airfoil blower, a double centrifugal blower, a belt-driven blower, a transflow blower, an axial fan and/or any other type of blower that blows a gaseous or non-gaseous fluid at variable rates.

The variable blower 126 may include a forcing element 202 that is a means for forcing the thermal fluid 108 through the variable blower 126. The forcing element 202 may include any component that adds kinetic energy to the thermal fluid 108 by movement of the component. For example, the forcing element 202 may move in order to force the thermal fluid 108 through the variable blower 126. The forcing element 202 may move faster to increase the flow rate of the thermal fluid 108. The forcing element 202 may move slower to decrease the flow rate of the thermal fluid 108. In some examples, the forcing element 202 may rotate about a drive axis 204. In the example illustrated in FIG. 1, the forcing element 202 includes an impeller 206 and a rotor 208 that rotates about the drive axis 204. Alternatively or in addition, the forcing element 202 may include any electrical component that electrically adds kinetic energy to the thermal fluid 108 without a moving part, such as an electrostatic fluid accelerator.

The impeller 206 may include any apparatus that is rotated by the variable blower 126 to force the thermal fluid 108 through the variable blower 126. The impeller 206 may include blower blades 210. The blower blades 210 may rotate with the impeller 206. In some examples, the impeller 206 may include a hub 212 and the blower blades 210 may join to the hub 212. The impeller 206 may include any type of impeller including, for example, an open impeller, a semi-open impeller, a shrouded impeller, single-suction impeller, double suction impeller, and/or any other type of impeller that moves gaseous or non-gaseous fluid.

The blower blades 210 may include blades that force the thermal fluid 108 through the variable blower 126 when the blower blades 210 are rotated by the variable blower 126. The blower blades 210 may include a forward curved blade, backward curved blade, radial blade, or any other type of blade for forcing gaseous or nongaseous fluid. The blower blades 210 may be arranged on the hub 212 in any manner that causes the thermal fluid 108 to move when the blower blades 210 rotate with the hub 212.

An adjustment to the forcing element 202 may increase or decrease the flow rate of the thermal fluid 108. For example, the variable blower 126 may increase or decrease the rotation speed of the blower blades 210 to cause a variance in the flow rate of the thermal fluid 108 that is applied to the engine case 104.

In some examples, the forcing element 202 may include one or more adjustable blower blades 214. Each adjustable blower blade 214 may include a blade that adjusts to cause more or less of the thermal fluid 108 though the variable blower 126. For example, a pitch 216 of the adjustable blower blade 214 may be adjusted by rotating the adjustable blower blade 214. The adjustable blower blade 214 may rotate about a blade axis 218. All, or a portion of, the adjustable blower blades may individually rotate to close a flow gap between the blades. For example, each of the respective pitches of the blower blades 210 may be adjusted. In some examples, the impeller 206 may rotate about a first axis, for example the drive axis 204, and the adjustable blower blade 214 may rotate about a second axis, for example a blade axis 218. Depending on the type of the impeller 206 and the blower blades 210, the blade axis 218 may be parallel with the drive axis 204. In other examples, the blade axis 218 may be perpendicular to the drive axis 204, or any other angle with respect to the drive axis 204.

In some examples, the forcing element 202 may include the rotor 208. The rotor 208 may attach to the hub 212 to rotate the hub 212. A rotational speed of the rotor 208 may increase to increase the rotational speed of the hub 212 and/or the blower blades 210. In other examples, the blower blades 210 may attach directly to the rotor 208. For example, the forcing element 202 may include an axial fan (not shown in FIG. 1). The axial fan may include the blower blades 210 arranged around the rotor 208 such that each of the blower blades 210 extends radially away from the drive axis 204.

In some examples, a variable speed drive 220 may drive the forcing element 202. The variable speed drive 220 may include one or more components that control the rate at which the thermal fluid 108 flows through the variable blower 126. For example, the variable speed drive 220 may vary a rotational speed 219 of the forcing element 202. In some examples, the variable speed drive 220 may adjust the forcing element 202 from a first rotational speed to a second rotational speed.

The variable speed drive 220 may include one or more components that are electrically, mechanically, and/or hydraulically powered to rotate the forcing element 202. Alternatively or in addition, the variable speed drive 220 may be electrically, mechanically, hydraulically controlled to vary the rotational speed 219 of the forcing element 202. In other examples, the variable speed drive 220 may include control logic 226 to vary the rotational speed 219 of the forcing element 202. In other examples, the variable speed drive 220 may include belts, pulleys, rollers, clutches, or other mechanical components that may adjust to vary the rotational speed 219 of the forcing element 202. Alternatively or addition, the variable speed drive 220 may include any electrical, mechanical, and/or hydraulic components that adjust to vary the rotational speed 219 of the forcing element 202. For example, the variable speed drive 220 may include a continuously variable transmission, an electrically adjustable speed drive, a belt-driven drive, an adjustable-speed drive, or any other type of drive that varies rotational output.

The variable speed drive 220 may include a drive shaft 222, a motor 224, and the control logic 226. The motor 224 may receive power and/or signals to rotate the drive shaft 222. The motor 224 may vary a rotational speed of the drive shaft 222. In some examples, the motor 224 may include an electric motor, for example an AC motor, a DC motor, or any other type of electrically powered motor. Alternatively or in addition, the motor 224 may connect with other mechanical components, such as gears, belts, or other components that are driven to rotate the drive shaft 222. The motor 224 may adjust rotation of the drive shaft 222 from a first rotational speed to a second rotational speed in response to changing from a first target flow rate to a second target flow rate. In some examples, the motor 224 may adjust rotation of the drive shaft 222 from a first rotational speed to a second rotational speed in response to varying an amount of power provided to the motor 224. In other examples, the motor 224 may respond to signals, for example analog or digital signals, to vary the rotational speed of the drive shaft 222 and/or the forcing element 202.

In some examples, the control logic 226 may control the variable blower 126. For example, the control logic 226 may cause the motor 224 to vary the rotational output of the motor 224. For example, the control logic 226 may cause the motor 224 to rotate the drive shaft 222 at multiple target rotational speeds. In some examples, the control logic 226 may send electrical signals to the motor 224 that cause the motor 224 to vary the rotational speed of the drive shaft 222 and/or the forcing element 202. Alternatively or in addition, the control logic 226 may provide varying levels of power to the motor 224 that cause the motor 224 to vary the rotational speed of the drive shaft 222 accordingly. Alternatively or in addition, the control logic 226 may vary the amount of power that the motor 224 receives from other power sources. For example, the control logic 226 may control electrical components, such as relays, transistors, regulators, and/or other electrical components that vary the voltage and/or current supplied to the motor 224. Alternatively or in addition, the control logic 226 may cause adjustments to mechanical components including, for example pulleys, belts, and other components. The adjustments to the mechanical components may vary the rotational output of the motor 224. In other examples, the control logic 226, the motor 224, the drive shaft 222, and/or any other component of the variable speed drive 220 may vary the rotational speed 219 of the forcing element 202 through pulse width modulation, switching frequency, dynamic breaking, and/or any other example of varying rotational output of the variable speed drive 220.

In some examples, the control logic 226 may receive operating information related to the gas turbine engine. The control logic 226 may vary the output of the variable blower 126 based on to the operating information. For example, the control logic 226 may cause the variable speed drive 220 to increase or decrease the rotational speed 219 of the forcing element 202 in response to the operational information. The operational information may include past, present, and/or predicted information corresponding to the gas turbine engine. For example, the operating information may include a temperature measurement corresponding to the engine case 104, the turbine blade 120, ambient temperature of the gas turbine engine, and/or any other temperature measurements corresponding to the gas turbine engine. Alternatively or in addition, the operational information may include any measurement of the gas turbine engine including, for example, a tip clearance measurement, engine RPM, a gas path temperature, as-build component size, a nacelle air temperature, time-on-point, and any other measurement related to the gas turbine engine or operation of the gas turbine engine.

In other examples, the control logic 226 may receive signals from one or more computing components configured to communicate with the control logic 226. For example, the one or more computing components may include a flight controller and/or other computer hardware included in the gas turbine engine. The control logic 226 may vary the output of the variable blower 126, as described here, based on the signals received form the one or more computing components.

The drive shaft 222 may include any rotating component that drives the forcing element 202. The drive shaft 222 may include a shaft affixed to the forcing element 202. The drive shaft 222 may rotate with the forcing element 202. In other examples, the forcing element 202 may connect with any forced structure of the variable speed drive 220.

As illustrated in FIG. 2, the forcing element 202 may include the impeller 206 and the rotor 208. In other examples, the forcing element 202 may additionally or alternatively include the drive shaft 222. Alternatively, the forcing element 202 may include the hub 212, one or more of the blower blades 210, and/or or any other component of the variable blower 126 that may be adjusted to force the thermal fluid 108 through the variable blower 126 at variable flow rates. In general, the forcing element 202 may include any type of movable component configured to force air through any type of variable blower. In some examples, the forcing element 202 may include adjustable sub-components which adjust to vary the thermal fluid 108 through the variable blower 126. Alternatively or in addition, the forcing element 202 itself may be adjusted to vary the flow rate of the thermal fluid 108. For example, the movement speed of the forcing element 202 may be increased and/or decreased to vary the flow rate of the thermal fluid 108.

The variable speed drive 220 may move the forcing element 202 at movement speeds determined, caused, and/or controlled by the variable speed drive 220, the motor 224, the control logic 226, and/or any other component of the variable speed drive 220. Alternatively, the control logic 226 may communicate with the variable blower 126 and/or other components of the variable blower 126 to vary the flow rate of the thermal fluid 108 through the variable blower 126.

The example illustrated in FIG. 1 is one example of the variable blower 126. In other examples, the variable blower 126 may include other examples of components which may determine, cause, and/or control the flow rate of the thermal fluid 108 applied to the engine case 104

Figure 3:
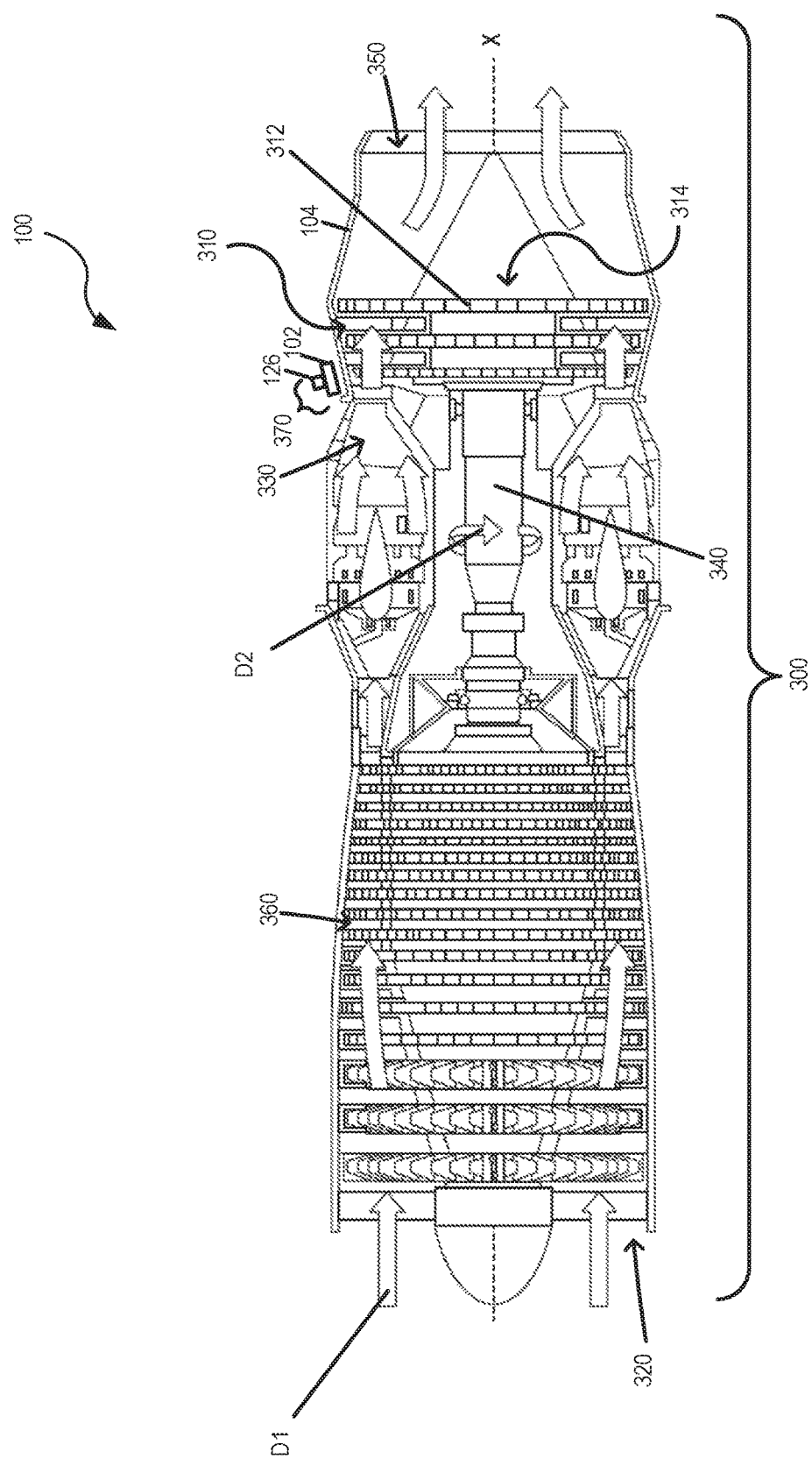
FIG. 3 illustrates a cross-sectional view of a gas turbine engine 300 for propulsion of an aircraft.

FIG. 3 is a cross-sectional view of a gas turbine engine 300 for propulsion of an aircraft. The system 100 may include the gas turbine engine 300. The gas turbine engine 300 may include an intake section 320, a compressor section 360, a combustion section 330, a turbine section 310, and an exhaust section 350. During operation of the gas turbine engine 300, fluid received from the intake section 320, such as air, travels along the direction D1 and may be compressed within the compressor section 360. The compressed fluid may then be mixed with fuel and the mixture may be burned in the combustion section 330. The combustion section 330 may include any suitable fuel injection and combustion mechanisms. The hot, high pressure fluid may then pass through the turbine section 310 to extract energy from the fluid and cause a turbine shaft of a turbine 314 in the turbine section 310 to rotate, which in turn drives the compressor section 360. Discharge fluid may exit the exhaust section 350.

As noted above, the hot, high pressure fluid passes through the turbine section 310 during operation of the gas turbine engine 300. As the fluid flows through the turbine section 310, the fluid passes between adjacent blades 312 of the turbine 314 causing the turbine 314 to rotate. The rotating turbine 314 may turn a shaft 340 in a rotational direction D2, for example. The blades 312 may rotate around an axis of rotation, which may correspond to a centerline X of the turbine 314.

The gas turbine engine 300 may further include the engine case 104 and a cooling apparatus 370. The cooling apparatus 370 may include the variable blower 126 and the distribution manifold 102 configured to cool the engine case 104 as described herein. As the combustion section 330 and other components of the gas turbine engine 300 generate heat, the engine case 104 may expand resulting in variations of the tip clearance between the turbine blades 312 and the engine case 104. The cooling apparatus 370 may extend along the engine case 104 across all of the turbine blades 312 included in the gas turbine engine 300. Alternatively, the cooling apparatus 370 may extend across a subset of the turbines blades 312, any portion of the turbine section 310, and/or the engine case 104. For example, the system 100 may include a discrete distribution manifold and variable blower corresponding to one or more respective stages of the turbines blades 312. In another example, the system 100 may include a first variable blower for a first stage of the turbines and a second variable blower for a second stage of the turbines. The first variable blower may vary the output of the first variable blower independently of the second variable blower.

Figure 4:
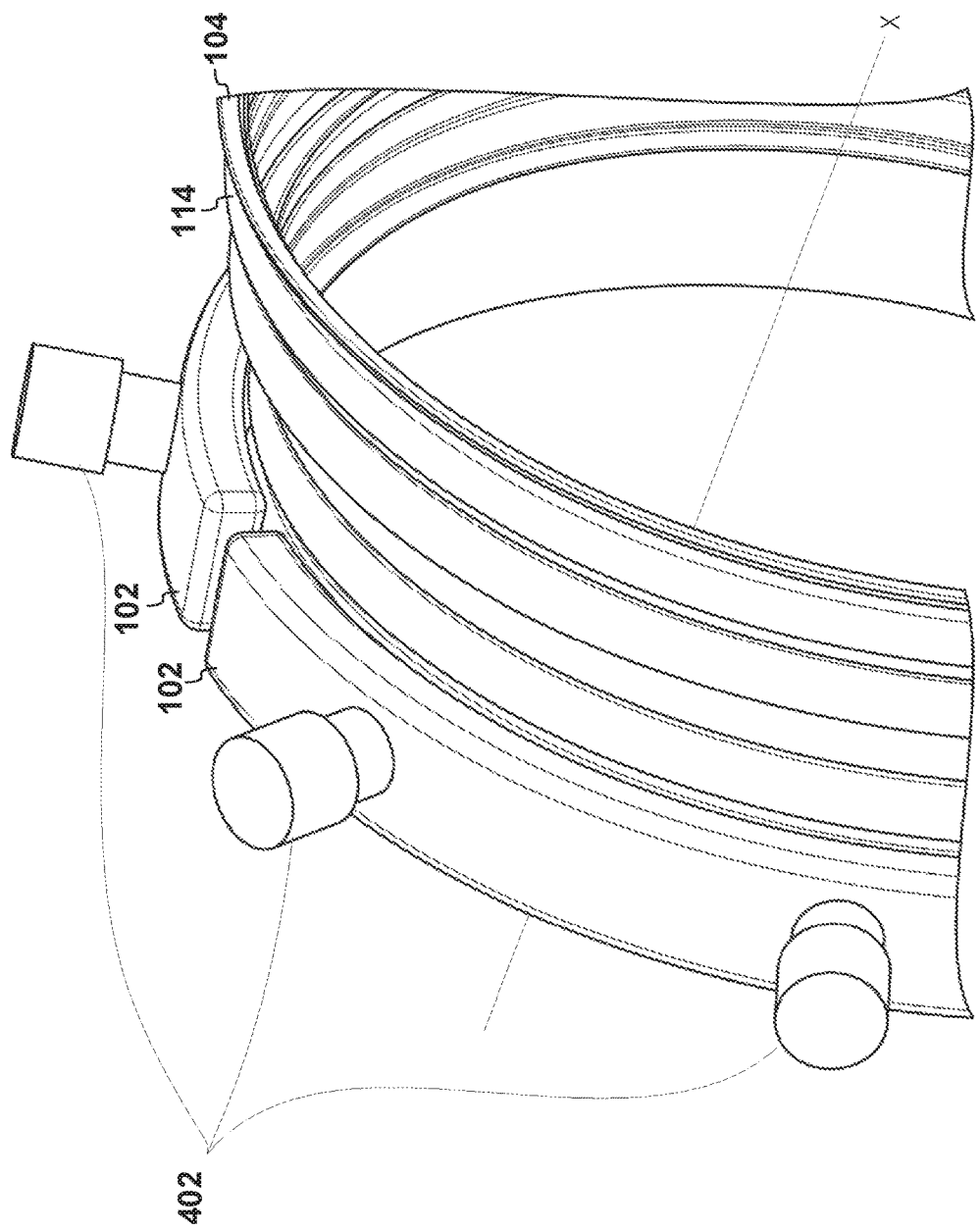
FIG. 4 illustrates a perspective view of an engine case cooled with multiple variable blowers.

FIG. 4 illustrates a perspective view of the engine case 104 cooled with multiple variable blowers 402. The variable blowers 402 may each be a blower like the variable blower 126 described above. The thermal fluid may pass through the variables blowers 402 without passing through a valve either within the variable blowers 402 or downstream of the variable blowers 402. The multiple variable blowers 402 may blow cooling fluid into one or more distribution manifold 102. In some examples, the flow rate from a first portion of the variable blowers 402 may vary independent of a second portion of the variable blowers 402. The first portion or the second portion of the variable blowers 402 may include one or more variable blowers. Alternatively or in addition, each of the variable blowers 402 may include a respective forcing element (not shown in FIG. 4). The respective forcing element may include any example of the forcing element described herein. The respective forcing element of each of the variable blowers 402 may adjust to independently vary the respective flow rate of thermal fluid provided by each of the variable blowers 402. In some examples computer logic may control each of the variable blowers 402 independently. In other examples, a separate computer logic may control the portion of the variable blowers 402.

The variable blowers 402 may be arranged on the distribution manifold 102 in any uniform or non-uniform pattern. Each of the variable blowers 402 may blow the thermal fluid into a respective portion of the distribution manifold 102. In some examples the variable blowers 402 may be uniformly positioned across the distribution manifold 102. Alternatively, the variable blowers 402, or any portion thereof, may be concentrated in a particular area of the distribution manifold 102 and/or along any region of the engine case 104. For example, the bottom half of the engine case 104 may include more variable blowers 402 than the top half. In other examples, the top half or any other portion of the engine case 104 may be arranged with a greater or lesser concentration of the variable blowers 402 to satisfy the thermal design considerations so the engine case 104.

Figure 5:
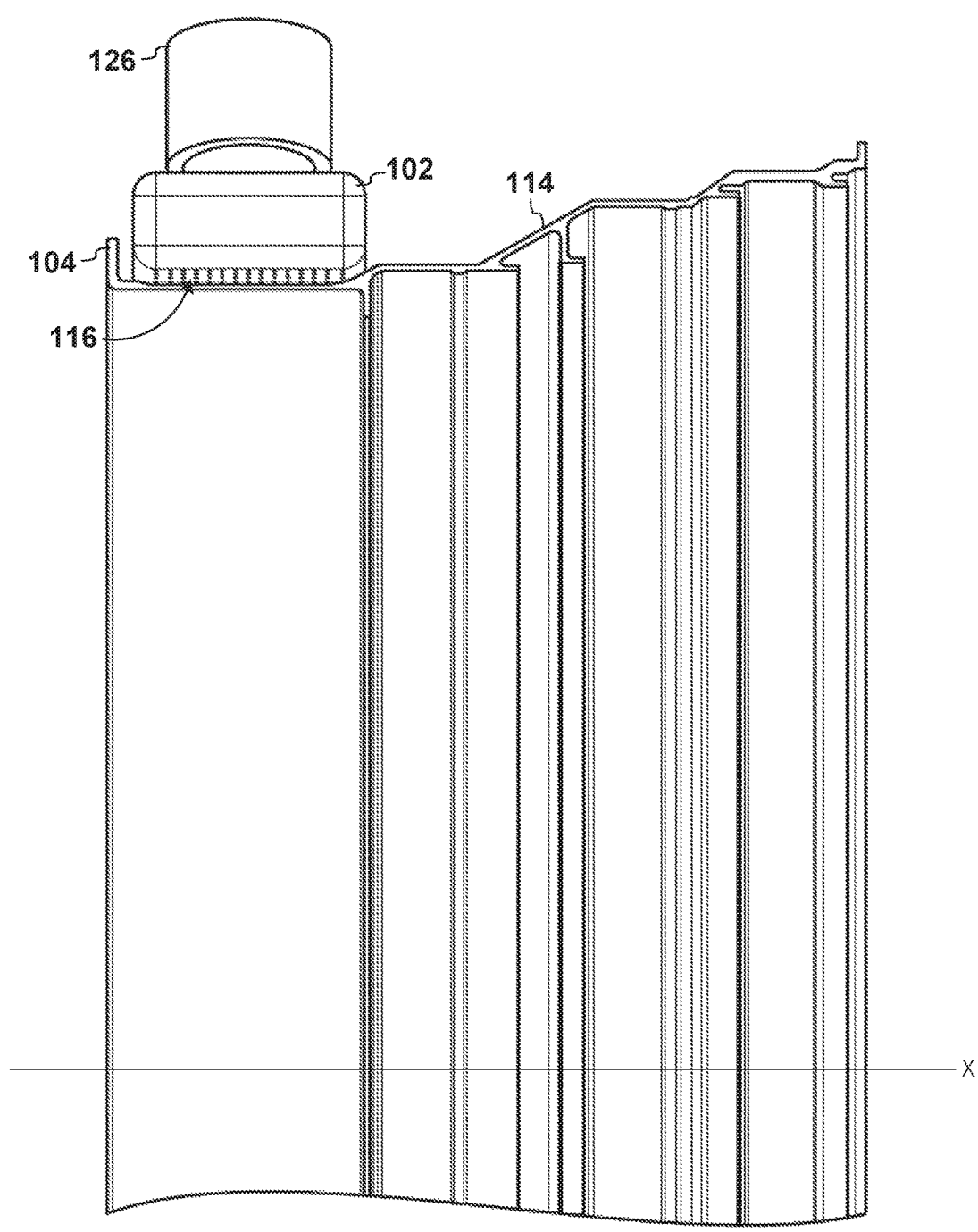
FIG. 5 illustrates a side view of an engine case cooled with a variable blower.

FIG. 5 illustrates a side view of the engine case 104 cooled with the variable blower 126. The variable blower 126 and the distribution manifold 102 may be positioned along the outer surface 114 of the engine case 104. The outlets from the variable blower 126 may direct cooling fluid onto the outer surface 114 of the engine case 104.

Figure 6:
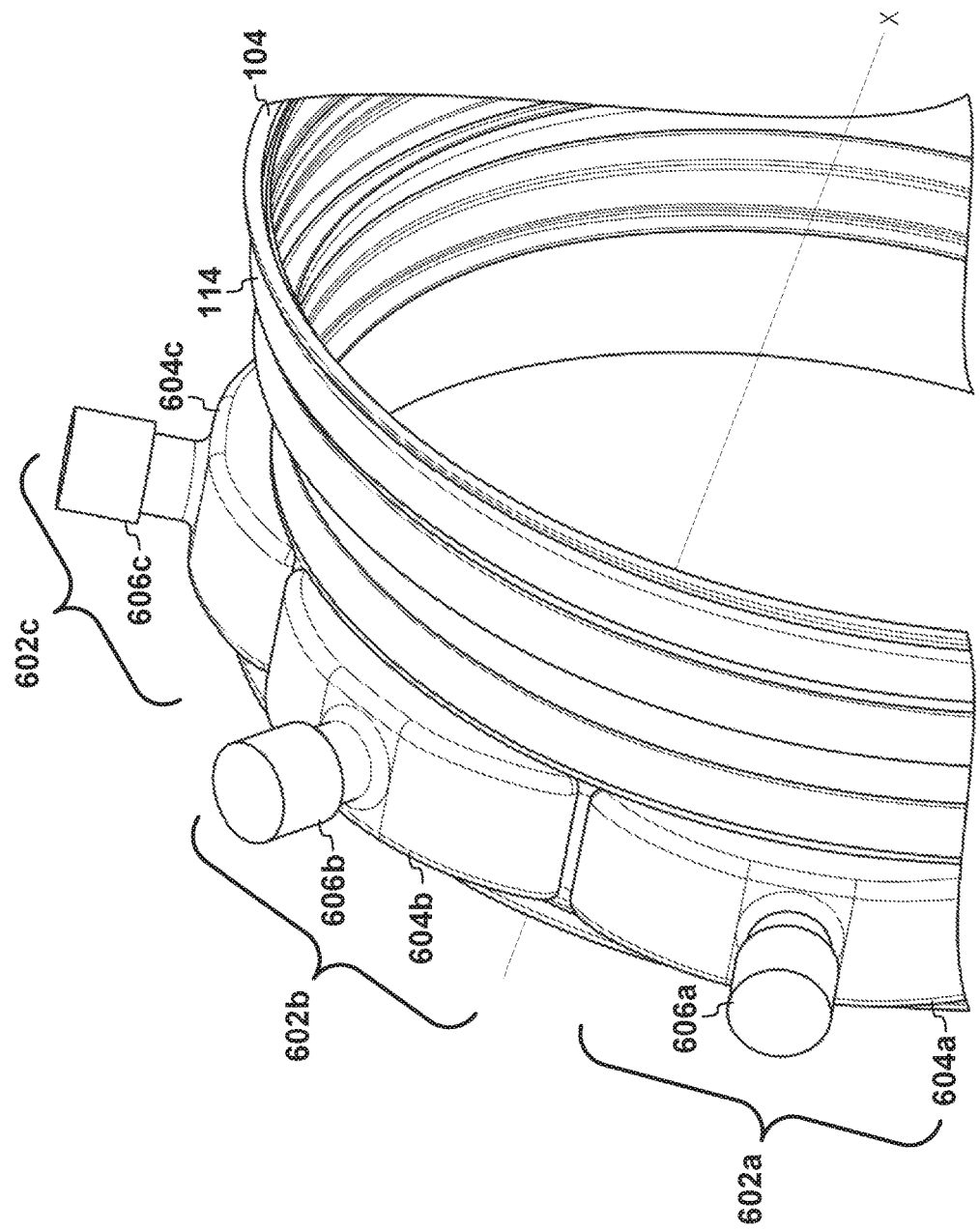
FIG. 6 illustrates a perspective view of an engine case configured with multiple cooling apparatuses.

FIG. 6 illustrates a perspective view of the engine case 104 configured with multiple cooling apparatuses 602. The multiple cooling apparatuses 602 (a portion shown in FIG. 6) may include, for example, a first cooling apparatus 602a, a second cooling apparatus 602b, and a third cooling apparatus 602c. The cooling apparatuses 602 may be positioned around the outer surface 114 of the engine case 104. For example, the cooling apparatuses 602 may be positioned around a circumference of a cross-section of the engine case 104, and may be arranged in a plane that is perpendicular to the centerline X. Alternatively or in addition, cooling apparatuses 602 may be axially aligned along the centerline X. Turbine blades (not shown in FIG. 4) may rotate inside of the engine case 104, radially inward from the cooling apparatuses 602.

The cooling apparatuses 602 may include respective distribution manifolds 604 and the respective variable blowers 606. The respective distribution manifolds 604 may include a first distribution manifold 604a, a second distribution manifold 604b and a third distribution manifold 604c. The respective variable blowers 606 may include a first variable blower 606a, a second variable blower 606b and a third variable blower 606c. In other examples, the cooling an alternative number of respective distribution manifolds 604 and/or respective variable blowers 606. It should be appreciated that the respective distribution manifolds 604 may include any example of a distribution manifold described herein. In addition, the respective variable blowers 606 may include any example of a variable blower described herein.

In some examples, a portion of the cooling apparatuses 602 may cool the outer surface 114 of the engine case 104 independent of other cooling apparatuses. For example, the first variable blower 606a may vary a first flow rate of thermal fluid independent of the second variable blower 606b and/or the third variable blower 606c. For example, the first variable blower 606a may adjust a first forcing element independent of adjusting a second forcing element of the second variable blower 606b. In some examples, the variable blower may include the adjustable blade 214 (not shown in FIG. 6). The adjustable blade 214 of the first variable blower 606a may adjust to a first pitch to provide a first flow rate and the adjustable blade 216 of the second variable blower 606b may adjust to a second pitch to provide a second flow rate.

Figure 7:
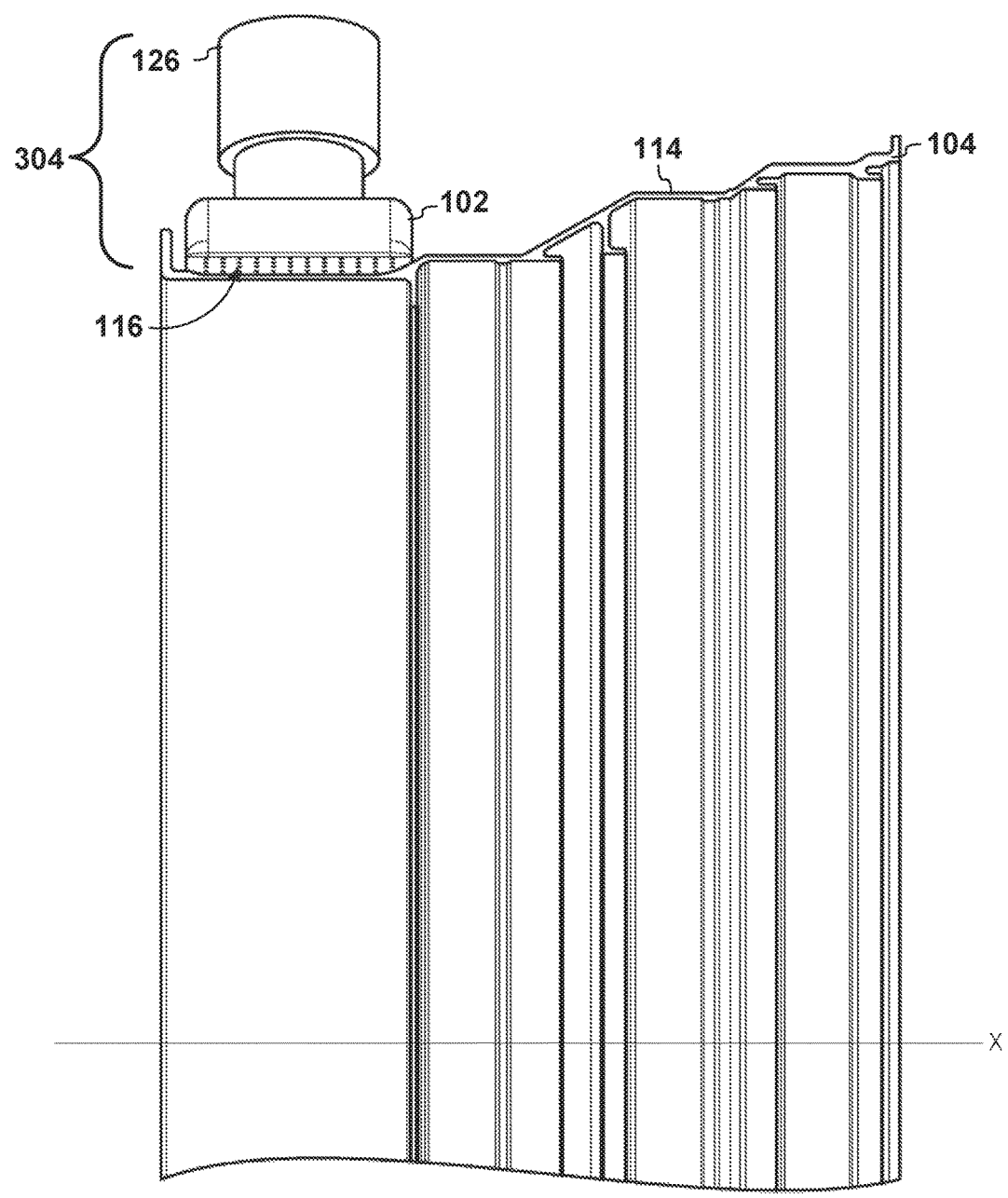
FIG. 7 illustrates a side view of an engine case configured with a cooling apparatus.

FIG. 7 illustrates a side view of the engine case 104 configured with the cooling apparatus 304. The cooling apparatus 304 may include the variable blower 126 and the distribution manifold 102. The distribution manifold 102 may axially extend along centerline X in any length along the outer surface 114 of the engine case 104. In addition, the distribution manifold 102 may include one or more of the variable blower 126 arranged in any manner along the centerline X.

Figure 8:
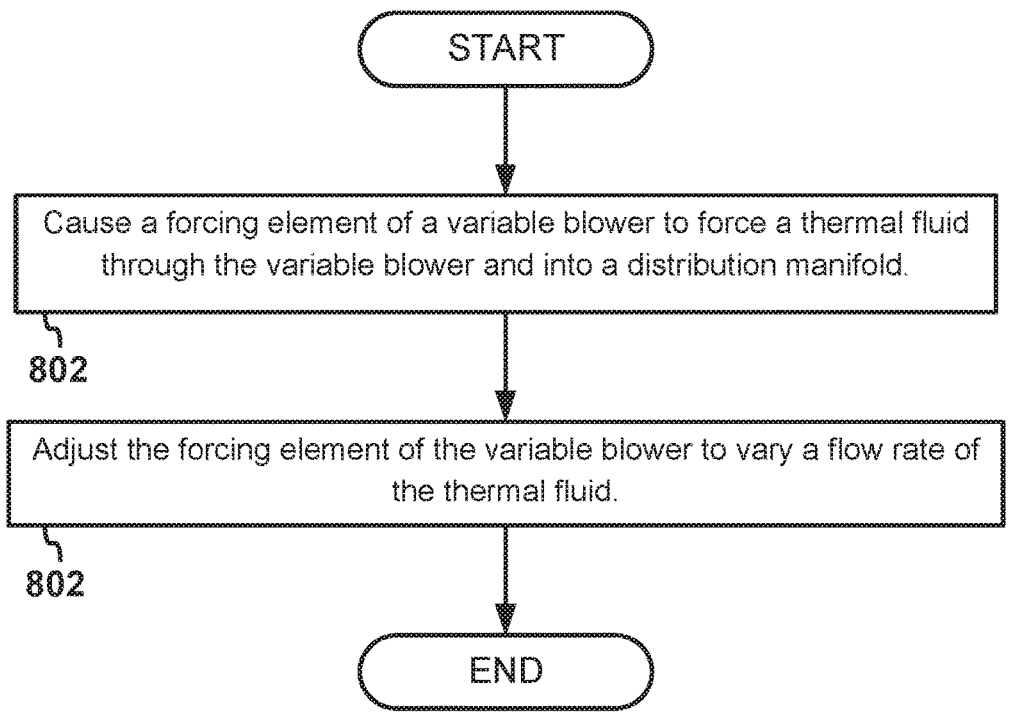
FIG. 8 illustrates an example of a flow diagram of logic for controlling tip clearance in a gas turbine engine.

FIG. 8 illustrates an example of flow diagram of logic for controlling tip clearance in the gas turbine engine. When the logic starts, the first operation may cause the forcing element 202 of the variable blower 126 to force the thermal fluid 108 through the variable blower 126 and into the distribution manifold 102 (802). A second operation may adjust the forcing element 202 of the variable blower 126 to vary the flow rate of the thermal fluid 108 applied to the engine case 104 (804). Adjustment of the forcing element 202 may include adjustment of the rotational speed 219 of the forcing element 202. Alternatively or in addition, adjustment of the forcing element 202 may include communicating a signal to the motor 224. The motor 224 may be configured to drive the forcing element 202. The motor 224 may adjust the rotational speed 219 of the forcing element 202 in response to the signal. Alternatively or in addition, adjusting the forcing element 202 may include adjusting power provided to the motor 224, the drive shaft 222, and/or any other component of the variable speed drive 220.

The logic illustrated in the flow diagrams in FIG. 4 may include additional, different, or fewer operations than illustrated. The operations illustrated may be performed in an order different than illustrated. For example, the logic may include an operation that causes the variable blower 126 to increase the flow rate of the thermal fluid 108 applied to the engine case 104. Alternatively or in addition, the logic may include an operation that causes the variable blower 126 to decrease the flow rate of the thermal fluid 108 applied to the engine case 104. Alternatively or in addition, the logic may an operation to increase the rotational speed of objects rotating in the variable blower 126. 20. In some examples, the logic may include an operation to adjust the forcing element further by receiving operational information corresponding to the gas turbine engine adjusting the forcing element in response to receipt of the operational information.

Figure 9:
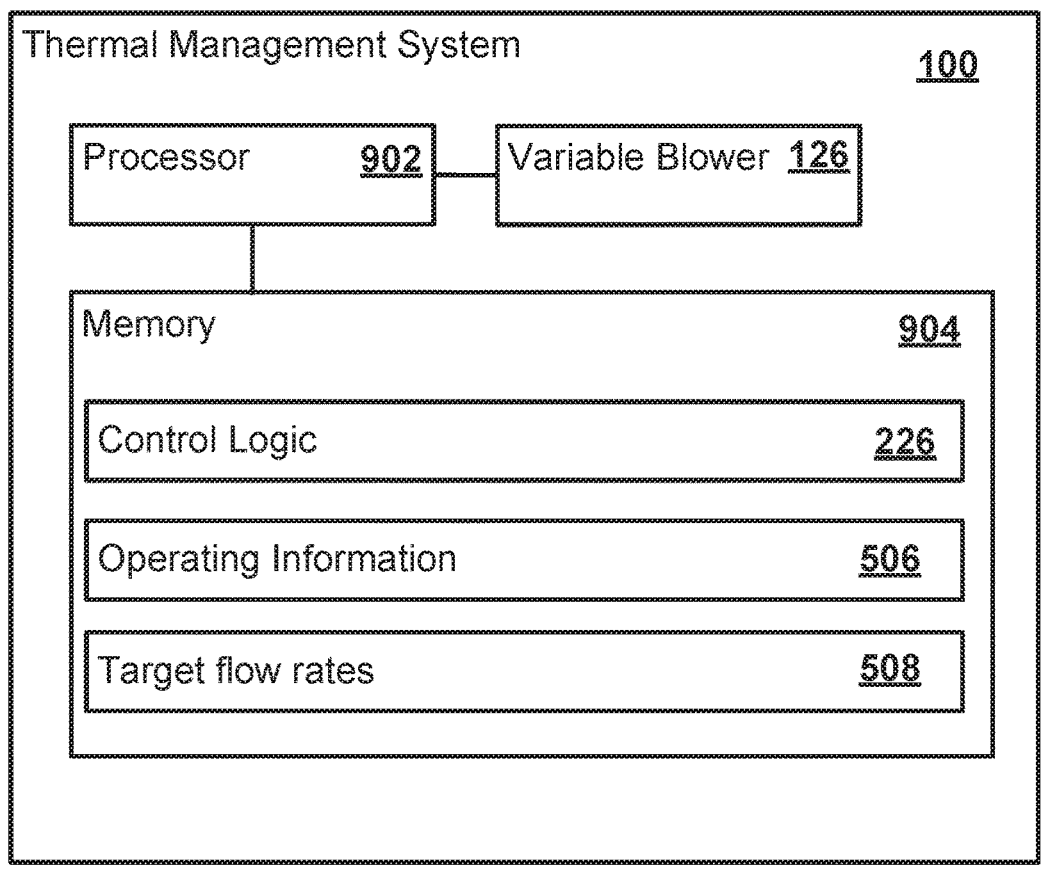
FIG. 9 illustrates an example of a system that includes a memory and a processor.

FIG. 9 illustrates an example of the system 100 that includes a memory 904 and a processor 902. The processor 902 may further include one or more devices operable to execute logic of the system 100. The logic of the system 100 may include computer executable instructions or computer code embodied in the memory 904 or in other memory that when executed by the processor 902, cause the processor 902 to perform the features implemented by the logic of the system 100 including the control logic 226. The computer code may include instructions executable with the processor 902.

The memory 904 may be any device for storing and retrieving data or any combination thereof. The memory 904 may include non-volatile and/or volatile memory, such as a random access memory (RAM), a read-only memory (ROM), an erasable programmable read-only memory (EPROM), or flash memory. Alternatively or in addition, the memory 904 may include an optical, magnetic (hard-drive) or any other form of data storage device.

In some examples, the memory 904 may include the control logic 226. Alternatively or in addition, the memory 904 may include any of the operating information 506 described herein. In other example, the operating information 506 may be received from a network interface (not shown in FIG. 5), or any other type signaling interface. Alternatively or in addition, the memory 904 may include one or more target flow rates 508. For example, the target flow rates 508 may include the range of non-zero target flow rates.

Each component may include additional, different, or fewer components. For example, the variable blower 126 may include the processor 902. Alternatively, as shown in FIG. 5, the processor 902 may be external to the variable blower and communicate with the variable blower 126.

The system 100 may be implemented in many different ways. Each module, such as the control logic 226, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 904, for example, that comprises instructions executable with the processor 902 or other processor to implement one or more of the features of the module. When any one of the module includes the portion of the memory that comprises instructions executable with the processor 902, the module may or may not include the processor 902. In some examples, each module may just be the portion of the memory 904 or other physical memory that comprises instructions executable with the processor 902 or other processor to implement the features of the corresponding module without the module including any other hardware. Because each module includes at least some hardware even when the included hardware comprises software, each module may be interchangeably referred to as a hardware module.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. An system, comprising:
   a distribution manifold positioned along an outer surface of an engine case of a gas turbine engine, the distribution manifold including a plurality of outlets defined on the distribution manifold to direct a thermal fluid received by the distribution manifold onto an outer surface of the engine case of the gas turbine engine; and
   a variable blower configured to blow the thermal fluid into the distribution manifold at a flow rate controlled by the variable blower, wherein the flow rate through the variable blower is adjustable over a range of non-zero target flow rates, wherein the flow rate adjusted by the variable blower is not adjusted by a physical valve, wherein the thermal fluid from the variable blower is applied to the plurality of outlets.
2. The aspects of claim 1, wherein the variable blower comprises a plurality of blower blades, wherein the variable blower is configured to adjust a rotational speed of the plurality of blower blades to vary the flow rate of the thermal fluid.
3. The aspects of any of claims 1-2, wherein the variable blower comprises an impeller, wherein the variable blower is configured to adjust the rotational speed of the impeller to vary the flow rate of the thermal fluid.
4. The aspects of any of claims 1-3, wherein a respective pitch of each of the plurality of blower blades is adjustable to vary the flow rate of the thermal fluid.
5. The aspects of any of claims 1-4, wherein the variable blower comprises a variable speed drive, the variable speed drive configured adjust a rotational speed of a forcing element to vary the flow rate of the thermal fluid applied to the engine case.
6. The aspects of any of claims 1-5, wherein the variable blower is configured to vary the flow rate of the thermal fluid in response to a change in power received by the variable blower.
7. The aspects of any of claims 1-6, wherein the variable blower is configured to vary the flow rate the thermal fluid after the variable blower has begun blowing the thermal fluid into the distribution manifold.
8. An apparatus for controlling tip clearance in a gas turbine engine comprising:
   a distribution manifold positioned along an engine case for a turbine of the gas turbine engine, the distribution manifold comprising a passageway for a thermal fluid, an inlet configured to direct the thermal fluid into the passageway, and an inner surface extending along an outer surface of the engine case, the inner surface of the distribution manifold including a plurality of outlets configured to receive the thermal fluid from the passageway and direct the thermal fluid from the passageway onto the outer surface of the engine case, wherein a tip of a turbine blade for the turbine is configured to rotate along an inner surface of the engine case radially inward from the outer surface of the engine case onto which the thermal fluid is directed; and a variable blower configured to provide the distribution manifold with the thermal fluid, the variable blower including an outlet in fluid communication with the inlet of the distribution manifold to define a flow path between the variable blower and the passageway, the variable blower including a means for forcing the thermal fluid through the outlet of the variable blower, wherein the means for forcing is adjustable to vary a flow rate of the thermal fluid over a range of non-zero target flow rates.

9. The aspect of claim 8, wherein the variable blower further includes a variable speed drive configured to adjust a rotational speed of the means for forcing.

10. The aspects of any of claims 8-9, wherein the variable speed drive includes a motor wherein the motor adjusts the rotational speed of the means for forcing in response to a change in power received by the motor.

11. The aspects of any of claims 8-10, wherein the means for forcing includes an impeller, wherein the variable blower adjusts a rotational speed to vary the flow rate of the thermal fluid applied to the engine case.

12. The aspects of any of claims 8-11, further comprising a plurality of variable blowers, the variable blowers, wherein each of the variable blowers include a respective forcing element adjustable to independently vary a respective flow rate for each of the variable blowers over a range of non-zero target flow rates.

13. The aspects of any of claims 8-12, wherein the means for forcing includes an adjustable blower blade, wherein the variable blower adjusts a pitch of the adjustable blower blade to vary the flow rate of the thermal fluid applied to the engine case.

14. The aspects of any of claims 8-13, wherein the means for forcing rotates to force air through the variable blower, wherein the variable blower is configured to vary a rotational speed of the means for forcing after the means for forcing has begun rotating.

15. A method, comprising
causing a forcing element of a variable blower to force a thermal fluid through the variable blower and into a distribution manifold comprising a plurality of outlets positioned along an outer surface of an engine case of a gas turbine engine; and
adjusting the forcing element of the variable blower to vary a flow rate of the thermal fluid applied to the engine case.

16. The aspect of claim 15, wherein adjusting the forcing element comprises adjusting a rotational speed of the forcing element.

17. The aspects of any of claims 15-16, wherein the forcing element comprises an impeller and adjusting the forcing element comprises increasing a rotational speed of the impeller after the impeller has begun rotating.

18. The aspects of any of claims 15-17, wherein the forcing element comprises an adjustable blower blade, wherein adjusting the forcing element comprises adjusting a pitch of the adjustable blower blade.

19. The aspects of any of claims 15-18, wherein adjusting the forcing element comprises signaling a variable speed drive configured to drive the forcing element to adjust a rotational speed of the forcing element.

20. The aspects of any of claims 15-19, wherein adjusting the forcing element further comprises:
receiving operational information corresponding to the gas turbine engine; and
adjusting the forcing element in response to receipt of the operational information.

What is claimed is:

1. A system, comprising:
a distribution manifold positioned along an outer surface of an engine case of a gas turbine engine, the distribution manifold including a plurality of outlets defined on the distribution manifold to direct a thermal fluid received by the distribution manifold onto an outer surface of the engine case of the gas turbine engine; and
a variable blower configured to blow the thermal fluid into the distribution manifold at a flow rate controlled by the variable blower, wherein the variable blower comprises a plurality of blower blades and the variable blower is configured to adjust a rotational speed of the plurality of blower blades to vary the flow rate of the thermal fluid, wherein the flow rate through the variable blower is adjustable over a range of non-zero target flow rates, wherein the flow rate adjusted by the variable blower is not adjusted by a physical valve, wherein the thermal fluid from the variable blower is applied to the plurality of outlets.

2. The system of claim 1, wherein the variable blower comprises an impeller, wherein the variable blower is configured to adjust the rotational speed of the impeller to vary the flow rate of the thermal fluid.

3. The system of claim 1, wherein a respective pitch of each of the plurality of blower blades is adjustable to vary the flow rate of the thermal fluid.

4. The system of claim 1, wherein the variable blower comprises a variable speed drive, the variable speed drive configured adjust a rotational speed of a forcing element to vary the flow rate of the thermal fluid applied to the engine case.

5. The system of claim 4, wherein the variable blower is configured to vary the flow rate of the thermal fluid in response to a change in power received by the variable blower.

6. The system of claim 1, wherein
the distribution manifold further comprises a passageway for the thermal fluid, an inlet configured to direct the thermal fluid into the passageway, and an inner surface extending along the outer surface of the engine case, the inner surface of the distribution manifold including the plurality of outlets, wherein a tip of a turbine blade for a turbine of the gas turbine engine is configured to rotate along an inner surface of the engine case radially inward from the outer surface of the engine case onto which the thermal fluid is directed.

7. An system comprising:
a distribution manifold positioned along an outer surface of an engine case of a gas turbine engine, the distribution manifold including a plurality of outlets defined on the distribution manifold to direct a thermal fluid received by the distribution manifold onto an outer surface of the engine case of the gas turbine engine; and
a variable blower configured to blow the thermal fluid into the distribution manifold at a flow rate controlled by the variable blower, wherein the variable blower is configured to vary the flow rate the thermal fluid after the variable blower has begun blowing the thermal fluid into the distribution manifold, wherein the flow rate through the variable blower is adjustable over a range of non-zero target flow rates, wherein the flow rate adjusted by the variable blower is not adjusted by a physical valve, wherein the thermal fluid from the variable blower is applied to the plurality of outlets.

8. The system of claim 7, wherein
the distribution manifold further comprises a passageway for the thermal fluid, an inlet configured to direct the thermal fluid into the passageway, and an inner surface extending along the outer surface of the engine case, the inner surface of the distribution manifold including the plurality of outlets, wherein a tip of a turbine blade for a turbine of the gas turbine engine is configured to rotate along an inner surface of the engine case radially inward from the outer surface of the engine case onto which the thermal fluid is directed.

9. The system of claim 7, wherein the variable blower further includes a variable speed drive configured to adjust a rotational speed of a means for forcing the thermal fluid through the variable blower.

10. The system of claim 9, wherein the variable speed drive includes a motor wherein the motor adjusts the rotational speed of the means for forcing in response to a change in power received by the motor.

11. The system of claim 7, wherein the variable blower includes an impeller, wherein the variable blower adjusts a rotational speed to vary the flow rate of the thermal fluid applied to the engine case.

12. The system of claim 7, further comprising a plurality of variable blowers, wherein each of the variable blowers include a respective forcing element adjustable to independently vary a respective flow rate for each of the variable blowers over a range of non-zero target flow rates.

13. The system of claim 7, wherein the variable blower includes an adjustable blower blade, wherein the variable blower adjusts a pitch of the adjustable blower blade to vary the flow rate of the thermal fluid applied to the engine case.

14. A method, comprising
causing a forcing element of a variable blower to force a thermal fluid through the variable blower and into a distribution manifold comprising a plurality of outlets positioned along an outer surface of an engine case of a gas turbine engine, the forcing element comprising an adjustable blower blade; and
adjusting a pitch of the adjustable blower blade to vary a flow rate of the thermal fluid applied to the engine case.

15. The method of claim 14, further comprising adjusting a rotational speed of the forcing element.

16. The method of claim 14, wherein the forcing element comprises an impeller, the method further comprising:
increasing a rotational speed of the impeller after the impeller has begun rotating.

17. The method of claim 14, further comprising: signaling a variable speed drive configured to drive the forcing element to adjust a rotational speed of the forcing element.

18. The method of claim 14, wherein adjusting the forcing element further comprises:
receiving operational information corresponding to the gas turbine engine; and
adjusting the forcing element in response to receipt of the operational information.

* * * * *

UNITED STATES PATENT AND TRADEMARK OFFICE
CERTIFICATE OF CORRECTION

PATENT NO. : 10,428,676 B2
APPLICATION NO. : 15/621667
DATED : October 1, 2019
INVENTOR(S) : Adrian Carl Sitler et al.

Page 1 of 1

It is certified that error appears in the above-identified patent and that said Letters Patent is hereby corrected as shown below:

In the Claims

In Column 16, Claim 7, Line 58, delete "An" and insert in its place --A--.

Signed and Sealed this
Ninth Day of June, 2020

Andrei Iancu
*Director of the United States Patent and Trademark Office*